(12) United States Patent
Takagi (10) Patent No.: US 6,426,162 B1
(45) Date of Patent: Jul. 30, 2002

(54) AIR CELL

(75) Inventor: Ryosuke Takagi, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/533,238

(22) Filed: Mar. 22, 2000

(30) Foreign Application Priority Data

Mar. 26, 1999 (JP) ............................................ 11-084619

(51) Int. Cl.$^7$ .............................. H01M 6/00; H01M 4/36
(52) U.S. Cl. ..................... 429/101; 429/162; 429/161; 429/59; 29/623.1
(58) Field of Search ..................... 429/101, 161–163, 429/59

(56) References Cited

U.S. PATENT DOCUMENTS

| | | | | |
|---|---|---|---|---|
| 3,869,314 | A | * | 3/1975 | Gillespie .................. 136/86 A |
| 4,404,266 | A | * | 9/1983 | Smilanich .................... 429/27 |
| 5,518,834 | A | * | 5/1996 | Yoshizawa et al. ........... 429/59 |
| 5,700,298 | A | * | 12/1997 | Shi et al. ................... 29/623.1 |
| 5,712,058 | A | * | 1/1998 | Malay ....................... 429/162 |
| 6,210,827 | B1 | * | 4/2001 | Dopp et al. ................. 429/122 |
| 6,261,709 | B1 | * | 7/2001 | Passaniti et al. .............. 429/27 |

FOREIGN PATENT DOCUMENTS

| | | | | |
|---|---|---|---|---|
| EP | 0662731 A2 | | 7/1995 | |
| JP | 1-167967 A | * | 7/1989 | ................. 429/59 |
| JP | 08306398 | | 11/1996 | |
| JP | 9-27304 A | * | 1/1997 | ................. 429/59 |
| JP | 9-35763 A | * | 2/1997 | ................. 429/59 |

* cited by examiner

Primary Examiner—Tom Dunn
Assistant Examiner—L. Edmondson
(74) Attorney, Agent, or Firm—Sonnenschein, Nath & Rosenthal (57) ABSTRACT

An air cell in which at least one end of a tubular air electrode is positively sealed to assure optimum leakage-proofing characteristics. The air cell includes an air electrode in the form of a hollow tube, a holding member abutted against at least one end of the air electrode along the circumference on the inner peripheral surface of the air electrode, a ring-like gasket arranged facing the holding member with the air electrode in-between, the ring-like gasket abutting along the circumference against the outer peripheral surface of the air electrode and a sealant member clinching the ring-like gasket and the air electrode along with the holding member for closing the end of the air electrode. The ring-like gasket seals the sealant member and the air electrode to each other by being clinched by the sealant member and the holding member.

13 Claims, 7 Drawing Sheets

AIR CELL

RELATED APPLICATION DATA

The present application claims priority to Japanese Application No. P11-084619 filed Mar. 26, 1999 which application is incorporated herein by reference to the extent permitted by law.

BACKGROUND OF THE INVENTION

1. Field of the Invention

This invention relates to an air cell having an air electrode for exploiting oxygen in air for a positive electrode reaction.

2. Description of Prior Art

Among the batteries, there is a so-called air cell which is a primary battery having an air electrode exploiting oxygen in air for a positive electrode reaction. This air cell, employing oxygen as a positive electrode active material, has a feature that there is no necessity of charging particles of e.g., manganese dioxide such that the air electrode can be thin in thickness. In the air cell, in which the air electrode as the positive electrode can be reduced in thickness, the capacity of the negative electrode can be increased correspondingly and hence the air cell is a high energy density battery having an extremely large discharge capacity per unit volume.

In the air cell, an air electrode having a porous electrode material and a gelated negative electrode mixture composed of the negative electrode active material, and an electrolyte solution, are accommodated, via a separator, in a battery can having at least air openings. In the air cell, outside air flows into the battery can bored in the wall section of the can, with the oxygen contained in the influx air then being adsorbed on the porous electrode material to undergo a positive electrode reaction.

In such air cell, both ends of the tubular air electrode were sealed to prevent the leakage of the gelated negative electrode mixture charged into the interior of the air electrode. Specifically, one of the opening ends is sealed by caulking a metallic ring constituting a sealant along with a resin gasket molded as one with the metallic ring. The other end of the air electrode is sealed by caulking metallic ring or a metallic cup.

In the above-described air cell, it is crucial to seal both ends of the air electrode reliably to improve solution leakage characteristics. However, the above-described air cell suffers from a problem that the solution leakage preventative performance at both ends of the battery cannot be said to be optimum.

SUMMARY OF THE INVENTION

It is therefore an object of the present invention to provide an air cell in which at least one end of a tubular air electrode is sealed reliably to improve the solution leakage preventative characteristics.

In one aspect, the present invention provides an air cell including an air electrode in the form of a hollow tube, a holding member abutted against at least one end of the air electrode along the circumference on the inner peripheral surface of the air electrode, a ring-like gasket arranged facing the holding member with the air electrode in-between, with the ring-like gasket abutting along the circumference against the outer peripheral surface of air electrode. The air cell also includes a sealant member clinching the ring-like gasket and the air electrode along with the holding member for closing the end of air electrode. The ring-like gasket seals the sealant member and the air electrode to each other by being clinched by the sealant member and the holding member.

In the air cell according to the present invention, the ring-like gasket is arranged between the sealant member provided on the outer peripheral side of the air electrode and the air electrode. Thus, with the present air cell, the interior of the air electrode, in the form of a hollow tube, is positively sealed by the sealant member and the ring-like gasket.

With the air cell according to the present invention, in which the ring-like gasket and the air electrode are clinched by the sealant member and the holding member, both ends of the air electrode can be positively sealed to improve leakage-proofing characteristics.

In another aspect, the present invention provides an air cell including an air electrode in the form of a hollow tube, an outer peripheral can in the form of a cylinder larger in diameter than the air electrode for accommodating the air electrode therein, and a groove formed on drawing. The groove radially compresses at least a portion of the outer peripheral surface of at least one end of the outer peripheral can. The air cell also includes a ring-like gasket arranged between air electrode and the outer peripheral can, with the ring-like gasket abutting along the circumference against the inner peripheral surface of one end of outer peripheral can. The air cell also includes a holding member arranged facing the ring-like gasket with the air electrode in-between, with the holding member abutting along the circumference against the inner peripheral surface of air electrode. The ring-like gasket seals the outer peripheral can and the air electrode relative to each other by being clinched by the groove formed on drawing in the outer peripheral can and holding member. In this air cell, according to the present invention, the ring-like gasket 11 is arranged between the air electrode and the outer peripheral can. In this air cell, a groove is formed on drawing in at least a portion of the outer peripheral can for thrusting the ring-like gasket. Thus, with the present air cell, the interior of the air electrode, formed as a hollow tube, can be positively sealed by the outer peripheral can and the ring-like gasket.

With the air cell according to the present invention, in which the ring-like gasket and the air electrode are clinched by the groove formed on drawing in the outer peripheral can and by the holding member, both ends of the air electrode can be positively sealed to improve leakage-proofing characteristics.

BRIEF DESCRIPTION OF THE DRAWINGS

FIGS. 5(*a*) and 5(*b*) are a cross-sectional view of a ring-shaped gasket shown as another example.

DESCRIPTION OF THE PREFERRED EMBODIMENTS

Referring to the drawings, preferred embodiments of according to the present invention will be explained in detail.

Figure 1:
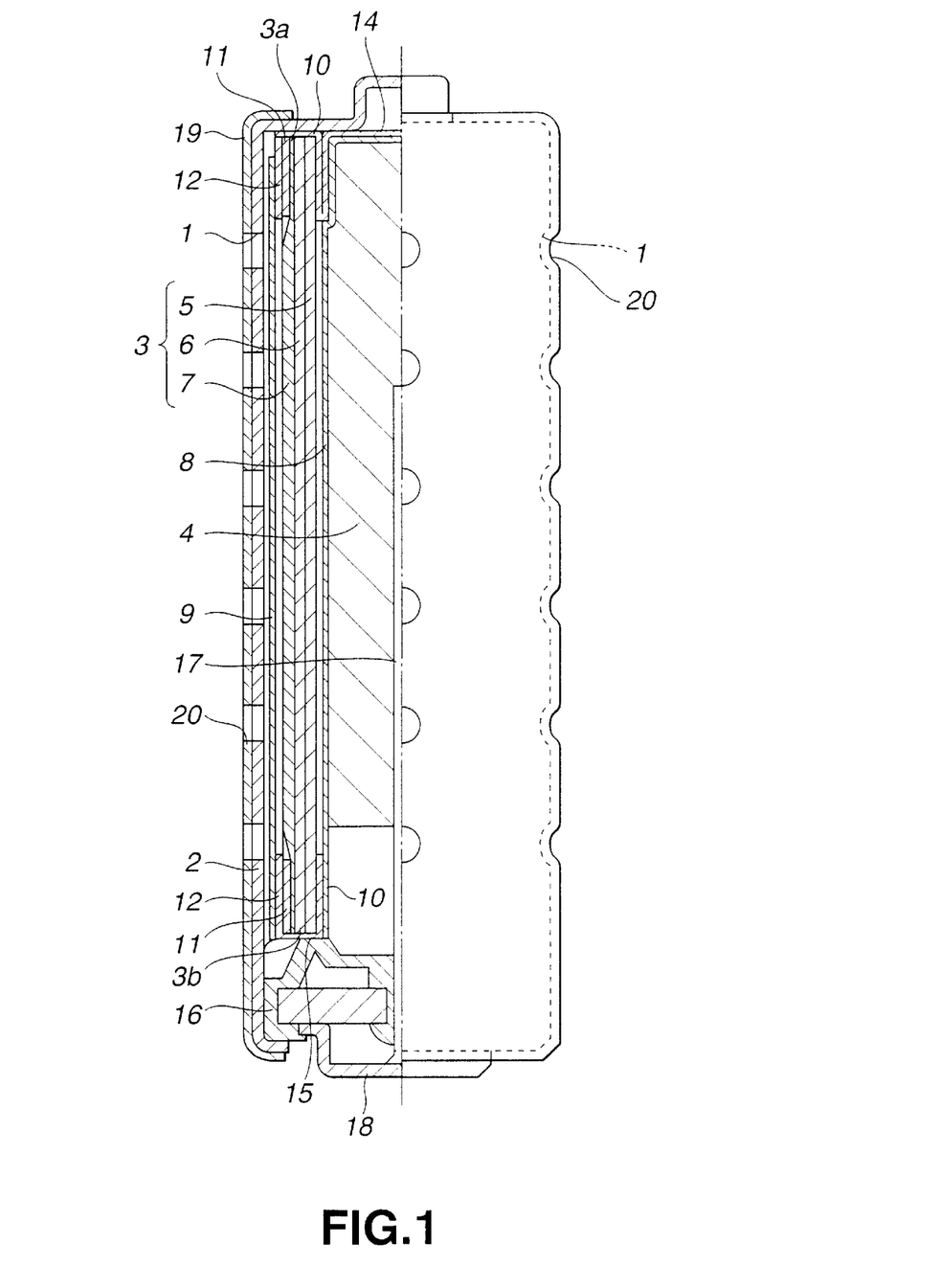
FIG. 1 is a cross-sectional view showing an illustrative structure of an air cell according to the present invention.

An air cell, shown as a first embodiment, includes, in a positive electrode can 2, having at least one air opening 1, an air electrode 3, employing oxygen in air for the positive electrode reaction, and a negative electrode mixture 4. In the air cell, the air electrode 3 is made up of a current collector 5, a catalytic layer 6 and a water-repellent fill 7 and is formed as a hollow tube accommodated via a diffusion paper sheet 9 in the interior of the positive electrode can 2. The negative electrode mixture 4 is charged via a separator 8 in a space defined by the inner peripheral wall of the tubular air electrode 3. On the inner peripheral surface of the air electrode 3 is arranged a separator 8 in contact therewith. The negative electrode mixture 4 is charged into the space surrounded by the separator 8.

The current collector 5 is a electrically conductive metallic net, expanded metal or punching metal, formed of stainless steel, nickel or nickel-plated stainless steel or iron. The catalytic layer 6 is a mixture comprised of a variety of metal oxides having oxygen reducing catalytic performance and a liquid dispersion of activated charcoal or polytetrafluoroethylene added to the metal oxide. The water-repellent film 7 is a porous film of a fluorine resin exhibiting a gas permeating and water-repellent performance.

Figure 2:
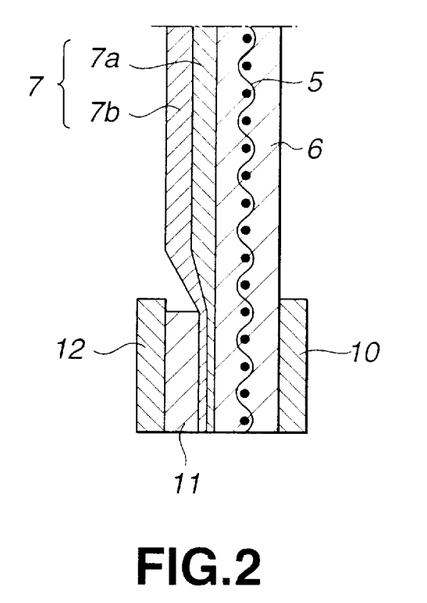
FIG. 2 is a cross-sectional view showing an essential portion of the air cell of FIG. 1 to an enlarged scale.

Referring to FIGS. 1 and 2, this air cell has a holding member 10 on each longitudinal end of the air electrode 3 in contact with the inner peripheral surface of the air electrode 3 for holding the air electrode from its inner periphery, a ring-like gasket 11 arranged in contact with the outer peripheral surface of the air electrode 3, and a sealant member 12 arranged for thrusting this ring-like gasket 11 against the outer peripheral surface of the air electrode 3. Referring to FIG.2, the water-repellent film 7 has a pressure-affixed water-repellent film 7a, pressure-affixed to the catalytic layer 6, and a non- pressure-affixed water-repellent film 7b arranged without being pressure-affixed to the pressure-affixed water-repellent film 7a.

The holding member 10 and the sealant member 12 are arranged on the air electrode 3 under a thrusting force acting to thrust them in a direction approaching towards each other. Thus, the holding member 10 and the sealant member 12 deform the water-repellent film 7 (made up of the pressure-affixed water-repellent film 7a and the non-pressure-affixed water-repellent film 7b) via the ring-like gasket 11. Meanwhile, a portion of the catalytic layer 6 is also deformed under the thrusting force applied to the holding member 10 and to the sealant member 12.

In this air cell, in which the holding member 10 and the sealant member 12 are arranged on the air electrode 3 under the force thrusting them in a direction approaching to each other, the space between the sealant member 12 and the air electrode 3 can be sealed reliably. Thus, it is possible to prevent the negative electrode mixture 4 charged in the air electrode 3 from leaking from the inside of the air electrode 3.

Specifically, a first metal sealant 14 made up of the holding member 10 and the sealant member 12, unified together, is arranged on one end 3a of the air electrode 3, whilst the ring-like gasket 11 is arranged between the air electrode 3 and the sealant member 12. The first metal sealant 14 is formed by warping a plate-shaped metallic member to a predetermined shape. This first metal sealant 14 is mounted on the air electrode 3, via the ring-like gasket 11, as the sealant member 12 is compressed in the radial direction. Thus, the ring-like gasket 11 is clinched by the first metal sealant 14, under compressing the pressure-affixed water-repellent film 7a and the non-pressure-affixed water-repellent film 7b, along with the air electrode 3.

In particular, if the height of the sealant member 12 as measured from the end of the air electrode 3 is Hca, the height of the holding member 10 as measured from the end of the air electrode 3 is Hcb and the height of the ring-like gasket 11 as measured from the end of the air electrode 3 is Hg, the following relationship:

$$Hca \geq Hg$$

$$Hcb \geq Hg$$

is met. Stated differently, since the ring-like gasket 11 of the air cell is of lower height than the holding member 10 and the sealant member 12, the entire lateral surface of the ring-like gasket 11 compresses against the sealant member 12. Thus, in this air cell, the sealant member 12 is able to thrust the ring-like gasket 11 efficiently, as a result of which the interior of the air electrode 3 can be sealed positively. Also since the first metal sealant 14 is electrically conductive it is electrically connected to the air electrode 3 across the catalytic layer 6 and the holding member 10. The first metal sealant 14 has its upper surface electrically connected to the positive electrode can 2.

Figure 3:
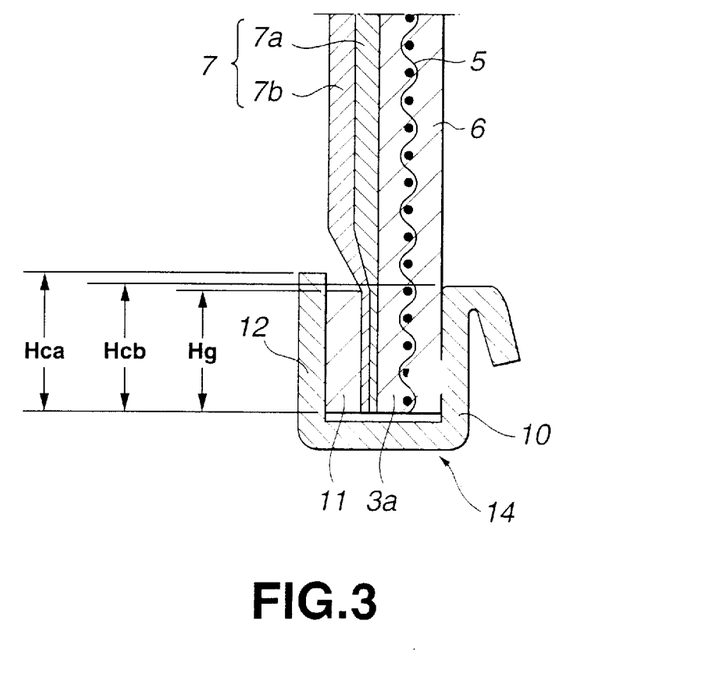
FIG. 3 is a cross-sectional view showing an and of an air electrode to an enlarged scale.

In the opposite end 3b of the air electrode 3, which is an open end of the air electrode 3, the holding member 10 and the sealant member 12 are formed as one with each other and a second metal sealant 15 having a substantially U-shaped cross-section is arranged in the open end. In the opposite end 3b of the air electrode 3l is arranged the ring-like gasket 11 between the air electrode 3 and the sealant member 12. This second metal sealant 15 again is mounted on the air electrode 3, via the ring-like gasket 11, as the sealant member 12 is compressed in the radial direction. Thus, the ring-like gasket 11 is clamped by the second metal sealant 15, along with the air electrode 3, in the deformed state of the pressure-affixed water-repellent film 7a and the non-pressure-affixed water-repellent film 7b.

If, in the second metal sealant 15, the height of the sealant member 12 as measured from the end of the air electrode 3 is Hca, the height of the holding member 10 as measured from the end of the air electrode 3 is Hcb and the height of the ring-like gasket 11 as measured from the end of the air electrode 3 is Hg, the following relationship:

$$Hca \geq Hg$$

$$Hcb \geq Hg$$

is met. Thus, in the opposite end 3b of the air electrode 3, the sealant member 12 is similarly able to thrust the ring-like gasket 11 efficiently to positively seal the interior of the air electrode 3.

On the opposite end 3b of the air electrode 3, there is arranged a gasket 16 so as to be bonded to the second metal sealant 15. This gasket 16 is formed of an insulating resin and is able to tightly seal the interior of the air electrode 3 by being bonded to the second metal sealant 15. On this gasket 15 is arranged a negative electrode terminal plate 18 passed through by a needle-shaped negative electrode current collector 17 and which is electrically connected to the proximal end of the negative electrode current collector 17. Thus, in this air cell, the negative electrode mixture charged into the inside of the air electrode 3, negative electrode current collector 17 and the negative electrode terminal plate 18 are electrically connected to one another.

On the outer peripheral surface of the positive electrode can 2 of the present air cell is wound an exterior film 19. In this exterior film 19 is formed an influx opening 20 in register with the air opening 1 to permit inflow of the outside air. Also, there is stuck a label on the outermost shell of the air cell stating the name of the company, warning or the like. Therefore, the exterior film may be designed to be printable, in which case the exterior film is preferably formed of a film having a smooth printable surface. In particular, an ester resin, an imide resin, an amide resin, a silicone resin, an urethane resin, an acrylic resin, a styrene resin, a vinyl resin, an olefinic resin, a cellulose resin, polycarbonates, polyacetal and copolymers of these resins, are preferably used.

In the above-described air cell, outside air is intruded via the influx opening and thence supplied to the air electrode. In this air cell, the positive electrode reaction occurs at the air electrode 3, using oxygen in air.

In the above-described air cell, the interior of the air electrode 3 is positively sealed by arranging the ring-like gaskets 11 at both ends of the air electrode 3. Therefore, it is possible with this air cell to seal the space between the air electrode 3 and the sealant member 12 to positively prevent leakage of the electrolyte solution from the interior of the air electrode 3. Thus, the present air cell is superior in leakage preventative properties to supply the power in stability.

Figure 4:
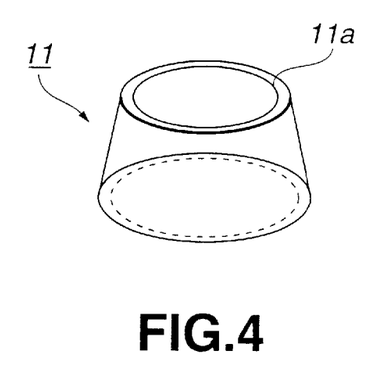
FIG. 4 is a perspective view of a ring-shaped gasket shown as an example.

Meanwhile, the ring-like gasket 11 may be substantially cylindrical with one end 11a smaller in diameter than the opposite side end 11b, as shown in FIG. 4. That is, the ring-like gasket 11 may be frusto-conically shaped. In this case, the ring-like gasket 11 is mounted on the air electrode 3 so that its small end 11a is on the end face side of the air electrode 3. Stated differently, the ring-like gasket 11 is mounted on each end of the air electrode 3 from its large end 11b.

Since the ring-like gasket 11 is mounted in this manner from the side of the large end 11b on the air electrode 3, it can be mounted easily on the air electrode 3 without press-fitting the ring-like gasket 11. On the other hand, in the present air cell, in which the small end 11a is positioned on the end face side of the air electrode 3, the ring-like gasket 11 can be positively tightly bonded to the air electrode 3.

Figure 5A:
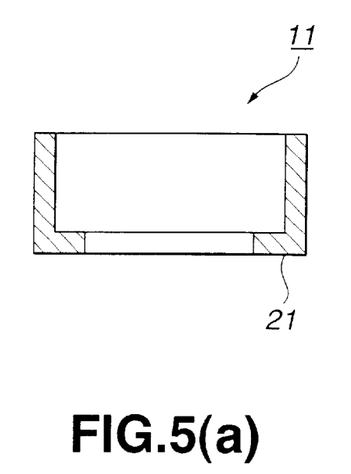
Figure 5B:
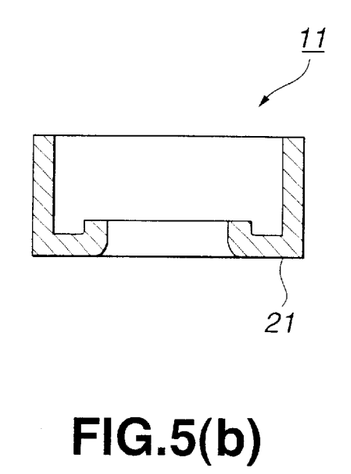

The ring-like gasket need not be substantially square-shaped in cross-section as in the above-described embodiment. For example, the ring-like gasket 11 can be provided with an engagement portion 21 adapted to be engaged with the end face of the air electrode 3, as shown in FIGS. 5a and 5b. The ring-like gasket 11 having this engagement portion 21 may be of substantially L-shaped cross-section, as shown in FIG. 5a. When mounted on the air electrode 3, the ring-like gasket 11, such as is shown in FIGS. 5a and 5b, is positioned by having the engagement portion 21 engaged with the end face of the air electrode 3.

If the ring-like gasket 11 is formed with the engagement portion 21 in this manner, the ring-like gasket 11 is positioned by having the engagement portion 21 engaged with the end face of the air electrode 3, the ring-like gasket 11 can be mounted correctly on the air electrode 3. The engagement portion 21, tightly bonded to the end face of the air electrode 3, is able to seal the end face of the air electrode 3. Therefore, in this case, the ring-like gasket is able to seal not only the space between the sealant member 12 and the air electrode 3 but also the space between the sealant member and the holding member. Thus, in this case, the interior of the air electrode 3 can be sealed further positively, thus demonstrating further superior solution leakage preventative properties.

Figure 6:
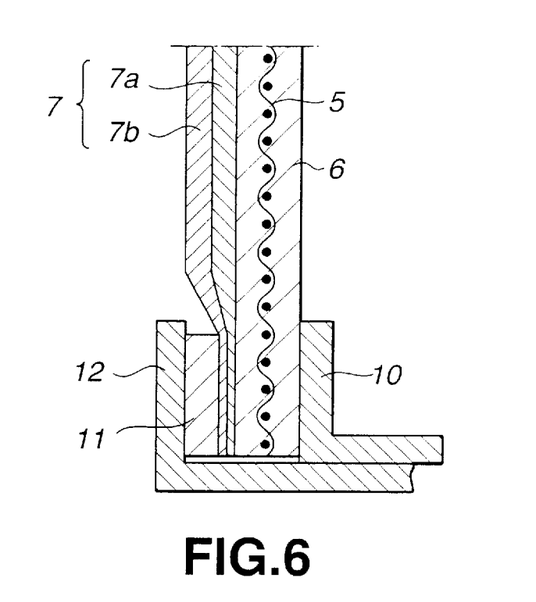
FIG. 6 is a cross-sectional view showing an end of an air cell to an enlarged scale.

Meanwhile, the holding member 10 and the sealant member 12 in the above-described embodiment are formed as one to constitute the first metal sealant 14. Alternatively, the holding member 10 and the sealant member 12 may also be formed as respective different members, as shown in FIG. 6. That is, in the present case, the holding member 10 and the sealant member 12 are formed to bottomed tubes having respective different diameters. That is, the holding member 10 is formed as a bottomed tube having an outer diameter approximately equal to the inner diameter of the air electrode 3, whilst the sealant member 12 is formed as a bottomed tube having an inner diameter approximately equal to the outer diameter of the ring-like gasket 11.

In this case, the holding member 10, constructed as described above, is mounted in contact with the inner peripheral surface of one end 3a of the air electrode 3, whilst the sealant member 12 is arranged on the outer peripheral surface of the end 3a via the ring-like gasket 11. The sealant member 12 then is compressed radially to clinch the ring-like gasket 11 and the air electrode 3 between the holding member 10 and the sealant member 12. This permits the ring-like gasket 11 to seal the space between the air electrode 3 and the sealant member 12 in the deformed state of the pressure-affixed water-repellent film 7a and the non-pressure-affixed water-repellent film 7b.

Figure 7:
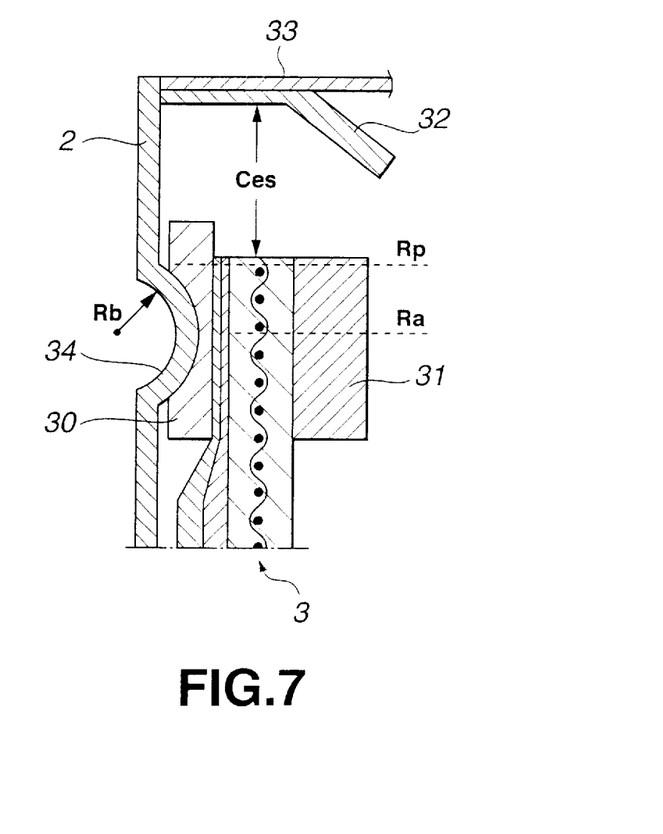
FIG. 7 is a cross-sectional view showing essential portions of an air cell according to a second embodiment of the present invention.

The second embodiment of the air cell according to the present invention is now explained. The air cell, shown as a second embodiment, includes a first ring-like gasket 30 between the positive electrode can 2 and the air electrode 3, and a holding member 31 in contact with the inner peripheral surface of the air electrode 3, as shown in FIG. 7. Meanwhile, FIG. 7 shows the negative electrode side having the gasket 32 and a neutral cover 33 arranged on this gasket 32, that is the opposite end 3b of the air electrode 3. However, in the air cell of the present embodiment, the above-described structure may be used for the end 3a, that is the positive electrode side, of the air electrode 3.

In the present air cell, a groove 34, formed by drawing, is provided in the portion of the positive electrode can 2 facing the first ring-like gasket 30. This groove 34 is produced by drawing along the circumference of the positive electrode can 2 in at least a portion in the circumferential direction of the positive electrode can 2. The groove 34, thus formed, thrusts the first ring-like gasket 30 to bring the latter into intimate contact with the air electrode 30. Stated differently, in the present air cell, the first ring-like gasket 30 and the air electrode 3 are clinched by the holding member 31 and the groove 34.

Thus, in the first ring-like gasket 30, the space between the air electrode 3 and the positive electrode can 2 can be positively sealed in the deformed state of the pressure-affixed water-repellent film 7a and the non-pressure-affixed water-repellent film 7b. Therefore, in the present air cell, the space between the positive electrode can 2 and the air electrode 3 can be positively sealed to demonstrate superior solution leakage preventative properties. In this case, the catalytic layer 6 may again be deformed, although not shown specifically.

Moreover, in the present air cell, the groove 34 is preferably arcuate in the cross-section taken along the center axis of the air electrode 3. If the radius of curvature of the arcuate shape of the groove 34 is Rb, the inner diameter of the positive electrode can 2 at the bottom of the groove 34 is Ra and the inner diameter of the positive electrode can 2 at the proximal end of the groove 34 is Rp, the following relationship:

$$Rb \geq Rp-Ra$$

preferably is met. If this relationship among Rb, Ra and Rp is met, the groove 34 has sufficient strength to maintain its pre-set shape against the force applied thereto along the longitudinal direction without collapsing. Thus, in this case, the air cell is able to positively seal the space between the positive electrode can 2 and the air electrode and to exhibit superior strength and shape stability.

The groove 34 is shaped so as to have a radius of curvature ranging between 0.5 and 5.0 mm. In such case, the dimension of the air cell conforms to the sizes of tan-1 to tan-4.

Moreover, in this air cell, there is preferably left a spacing between the gasket 32 and the opposite end 3b of the air electrode 3, as indicated by Ces in FIG. 7. By spacing the gasket 32 and the opposite end 3b of the air electrode 3 in this manner, the air electrode 3 may be prohibited from being warped when the gasket 32 is fitted on the positive electrode can 2. Thus, the air cell is further superior in leakage preventative characteristics. The spacing between the opposite end 3b of the air electrode 3 and the gasket 32 is preferably 0.3 to 2.0 mm. If the separation between the opposite end 3b of the air electrode 3 and the gasket 32 is less than 0.3 mm, the air electrode 3 undesirably tends to be warped when the gasket 32 is fitted to the positive electrode can 2. If the separation between the opposite end 3b of the air electrode 3 and the gasket 32 exceeds 2.0 mm, the negative electrode mixture undesirably tends to be intruded into this space to promote internal shorting.

Figure 8:
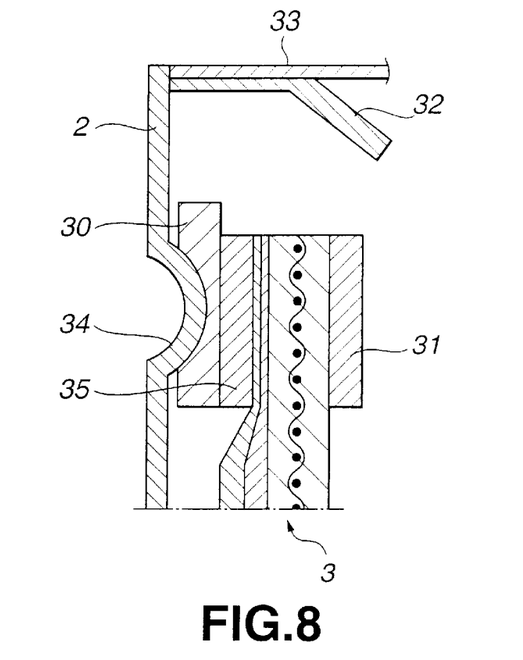
FIG. 8 is a cross-sectional view showing essential portions of an air cell as another form of the second embodiment.

In the present air cell, a sealing member 35 may be provided between the first ring-like gasket 35 and the air electrode 3, as shown in FIG. 8. Stated differently, the air cell may be of such a structure in which the first ring-like gasket 30 is arranged between the groove 34 formed in the positive electrode can 2 and the sealant member 35.

Figure 9:
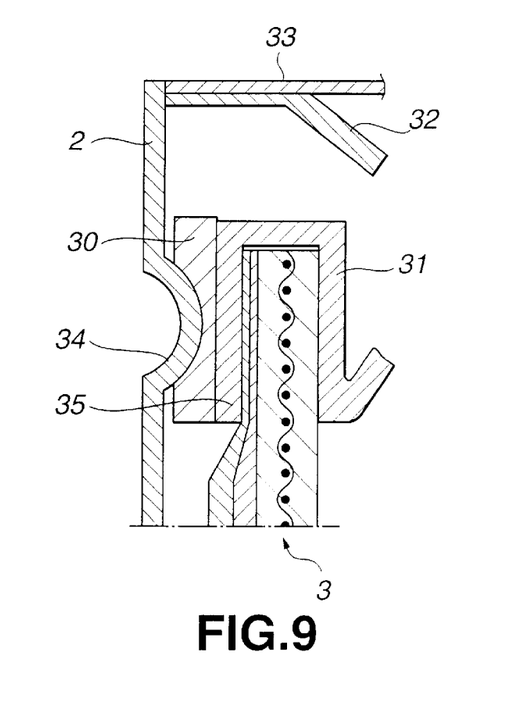
FIG. 9 is a cross-sectional view showing essential portions of an air cell as still another form of the second embodiment.
Figure 10:
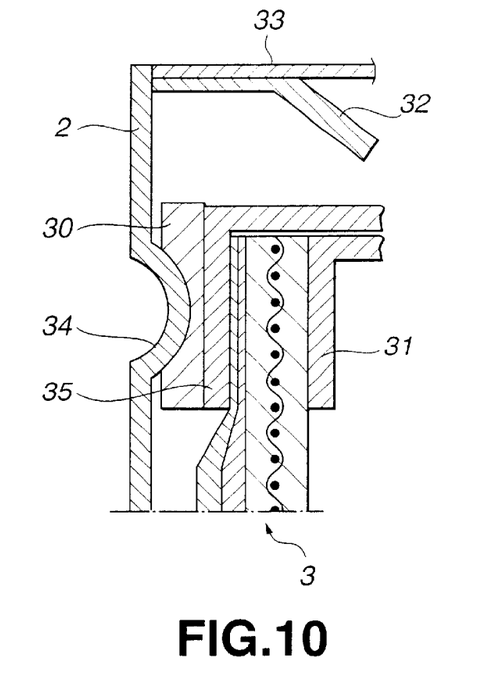
FIG. 10 is a cross-sectional view showing essential portions of an air cell as still another form of the second embodiment.

Specifically, the sealant member 35 may be formed as-one with the holding member 31, as shown in FIG. 9. In such case, the air electrode 3 is clinched between the holding member 31 and the sealant member 35 and thereby held positively. The holding member 31 and the sealant member 35 may be of the bottomed tubular shape, as shown in FIG. 10. In such case, the air electrode 3 is held reliably by being clinched between the holding member 31 and the sealant member 35.

In these cases, the first ring-like gasket is thrust by the groove 34 formed in the positive electrode can 2 against the sealant member 35 to seal the space between the positive electrode can 2 and the sealant member 35 reliably. In this case, the pressure-affixed water-repellent film 7a and the non-pressure-affixed water-repellent film 7b of the air electrode 3 are deformed by being thrust by the sealant member 35.

Figure 11:
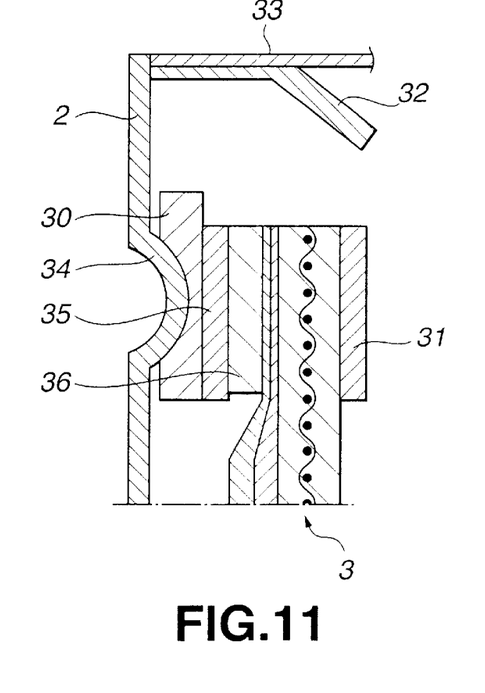
FIG. 11 is a cross-sectional view showing essential portions of an air cell as still another form of the second embodiment.

Also, in the air cell having the sealant member 35, a second ring-like gasket 36 is preferably provided between the air electrode 3 and the sealant member 35. That is, in this air cell, the first ring-like gasket 30 is arranged between the positive electrode can 2 and the sealant member 35, whilst the second ring-like gasket 36 is provided between the sealant member 35 and the air electrode 3.

Figure 12:
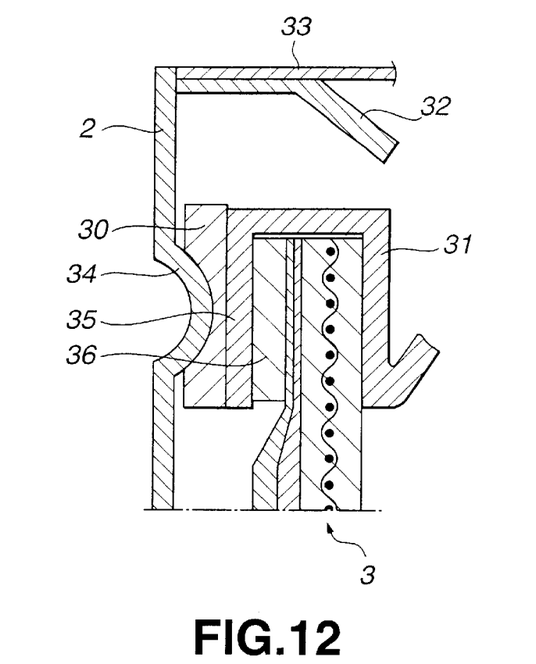
FIG. 12 is a cross-sectional view showing essential portions of an air cell as still another form of the second embodiment.

In more detail, if the holding member 31 and the sealant member 35 are formed as one as shown in FIG. 12, the air electrode 3 is inserted into the space between the holding member 31 and the sealant member 35, as the second ring-like gasket 36 is arranged on the outer peripheral surface of the air electrode 3. The sealant member 35 then is compressed radially to clinch the air electrode 3 and the second ring-like gasket 36 by the holding member 31 and the sealant member 35. This positively seals the space between the sealant member 35 and the air electrode 3.

With the first ring-like gasket 30 mounted on the outer peripheral surface of the sealant member 35, the air electrode 3 and the first ring-like gasket 30 are intruded into the interior of the positive electrode can 2. The positive electrode can 2 is drawn at a pre-set position to form the groove 34 which will thrust the first ring-like gasket 30. This positively seals the space between the sealant member 35 and the air electrode 3. Thus, in the air cell shown in FIG. 12, the space between the positive electrode can 2 and the sealant member 35 is sealed positively by the first ring-like gasket 30, while the space between the sealant member 35 and the air electrode 3 is sealed reliably by the second ring-like gasket 36. Consequently, with the present air cell, leakage of the negative electrode mixture 4 charged into the interior of the air electrode 3 can be prohibited reliably.

Figure 13:
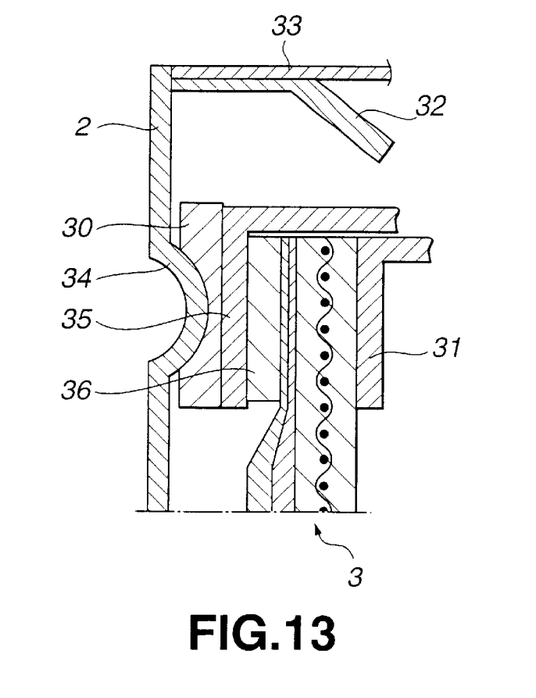
FIG. 13 is a cross-sectional view showing essential portions of an air cell as yet another form of the second embodiment.

Also, in the air cell, the holding member 31 and the sealant member 35 are formed as respective different members, as shown in FIG. 13. That is, in the present case, the holding member 31 and the sealant member 35 are of pre-set diameters and are tubular in shape so as to have an opening in the bottom. Specifically, the holding member 31 is in the form of a bottomed tube having an outer diameter approximately equal to the inner diameter of the air electrode 3, whilst the sealant member 35 is in the form of a bottomed tube having an inner diameter approximately equal to the outer diameter of the second ring-like gasket 36.

In this case, the holding member 10 is first placed in contact with the inner peripheral surface of the air electrode 3. The sealant member 35 is arranged, via the second ring-like gasket 36, on the outer peripheral surface of the air tube 3. The sealant member 35 then is contracted radially to clinch the second ring-like gasket 36 and the air tube 3 between the holding member 31 and the sealant member 35. This allows the second ring-like gasket 36 to seal the space between the air electrode 3 and the sealant member 35 in the compressed state of the pressure-affixed water-repellent film 7a and the non-pressure-affixed water-repellent film 7b.

As the first ring-like gasket 30 is mounted on the outer peripheral surface of the sealant member 35, the air electrode 3 and the first ring-like gasket 30 are intruded into the interior of the positive electrode can 2. The positive electrode can 2 is processed with drawing at a pre-set location to form the groove 34 which will thrust the first ring-like gasket 30. This positively seals the space between the positive electrode can 2 and the sealant member 35.

In this manner, in the air cell shown in FIG. 13, the first ring-like gasket 30 positively seals the space between the positive electrode can 2 and the sealant member 35, whilst the second ring-like gasket 36 positively seals the space between the sealant member 35 and the air electrode 3. Therefore, in this air cell, leakage of the negative electrode mixture 4, charged into the interior of the air electrode 3, can be sealed reliably.

In particular, if, in the present air cell, shown in FIGS. 12 and 13, the height of the sealant member 35 as measured from the end of the air electrode 3 is Hca, the height of the holding member 31 as measured from the end face of the air electrode 3 is Hcb and the height of the second ring-like gasket 36 as measured from the end face of the air electrode 3 is Hg, the following relationship:

$$Hca \geq Hg$$

$$Hcb \geq Hg$$

is met. Stated differently, the second ring-like gasket 36 in these air cells is of lower height than the holding member 31 or the sealant member 35, so that the second ring-like gasket 36 with its entire lateral surface compresses against the sealant member 35. Thus, with the present air cell, the sealant member 35 is able to thrust the second ring-like gasket 36 efficiently, thereby positively sealing the interior of the air electrode 3.

EXPERIMENTAL EXAMPLES

For verifying the above-described leakage characteristics of the air cell, the following samples were prepared and an experiment was conducted on these samples.

Experiment 1
Sample 1

First, air electrodes were prepared as follows: That is, carbon black, activated charcoal and an aqueous dispersion of a manganese oxide, with a solid content of 60%, were mixed so that the solid content ratio will be 3:1:3:3 to give a paste-like catalytic layer mixture. This paste-like catalytic layer mixture was rolled by being passed through a space between press rolls heated to approximately 60° C. to prepare a sheet 0.6 mm in thickness. This sheet then was coiled about a current collector constituted by a nickel-plated sintered stainless steel net in the shape of a hollow cylinder, and was subjected in this state to drying and press rolling to produce a hollow cylindrical catalytic layer having a thickness of 0.5 mm in thickness. On the peripheral surface of this hollow cylindrical catalytic layer, a water-repellent film, constituted by a water-repellant polytetrafluoroethylene, 0.1 mm in thickness, having the capability of permeating an oxygen gas, was placed and subjected to press-rolling. The winding start end and the winding terminal end of the water-repellent film, measuring approximately 5% of the size of the outer periphery of the air electrode (about 2 mm) were superimposed one on the other with a polyethylene film 50 $\mu$m in thickness in-between. The resulting product was heat-treated at 250° C. to melt the polyethylene film to fuse the winding start end and the winding terminal end of the water-repellent film together.

On both ends of the air electrode were mounted metal sealants, constituted by a holding member and a sealant member, each being substantially U-shaped in cross-section. These metal sealants then were compressed radially to attach the metal sealants to the air electrode. This produced a cylindrically-shaped air electrode 13 mm in outer diameter and 44 mm in height. In these metal sealants, Hca is 10 mm and Hcb is 10 mm.

This tubular air electrode then was intruded into the positive electrode can and a ring-like gasket of synthetic resin, having a substantially L-shaped cross-section, was mounted on the outer peripheral surface of the metal sealant positioned at the opening end of the positive electrode can. The outer peripheral surface of the positive electrode can then was processed with drawing to form a groove with a radius of curvature Rb equal to 0.3 mm.

Then, a cellophane sheet and a non-woven cloth were introduced in this order, as a separator, to overlie the inner peripheral surface of the air electrode arranged in the positive electrode can 2. In the separator of the air electrode was charged a gelated negative electrode mixture composed of powders of zinc alloys, zinc oxide, a gelating agent and an electrolyte solution with a mixing ratio of 6:1:1:2. In the opening end of the positive electrode can was fitted a sealant structure comprised of a gasket, a neutral cover, a negative electrode terminal plate and a negative electrode current collector. At this time, the gasket of the sealant structure and the air electrode were press-bonded together, with the vale of Ces being 0 mm.

Finally, an exterior film, having an air opening, was bonded to the outer peripheral surface of the positive electrode can and the air opening seal covering the air opening was stuck to complete a sample 1 of the air cell with an outer diameter of 14 mm and a height of 48 mm.

Samples 2 to 4

Samples 2 to 4 of the air cell were fabricated in the same way as the sample 1 except that a ring-like gasket 11 of synthetic resin, having a cross-sectional shape as indicated on Table 1, was arranged between a sealant member of the metal sealant and the air electrode.

Sample 5

A sample 5 of the air cell was fabricated in the same way as the sample 1 except that a ring-like gasket of a substantially rectangular cross-section was arranged between a sealant member of the metal sealant and the air electrode.

Measurements were made of leakage-proofing characteristics and closed-circuit voltage of these samples 1 to 6 of the air cell. For measuring the leakage-proofing characteristics, 1000 air batteries were charged into a constant temperature air tank at 60° C. and stored for a pre-set number of days to count the number of the air batteries in which leakage occurred. For measuring the closed-circuit voltage, the air opening seal was peeled off from the completed air cell. After 30 seconds, the battery was electrically discharged at a load of 42Ω for 0.5 second. The voltage at this time was used as the closed-circuit voltage. The results are shown in Table 1.

TABLE 1

| samples | ring-like gasket present or not | cross-section | sealant member side | holding member side | leakage proofing characteristics (per 1000) | closed circuit voltage (V) |
|---|---|---|---|---|---|---|
| sample 1 | x | — | — | — | 247 | 1.26 |
| sample 2 | o | approximately square-shaped | o | x | 0 | 1.28 |
| sample 3 | o | approximately L-shaped | o | x | 0 | 1.25 |
| sample 4 | o | approximately J-shaped | o | x | 0 | 1.28 |
| sample 5 | o | approximately square-shaped | o | o | 0 | 1.02 |
| sample 6 | o | U-shaped | o | o | 0 | 0 |

As may be seen from the above Table 1, the samples in which a ring-like gasket was arranged between the sealant member of the metal sealant and the air electrode (samples 2 to 4) demonstrated superior leakage-proofing characteristics while maintaining a pre-set closed-circuit voltage. The sample not provided with the ring-like gasket between the sealant member of the metal sealant and the air electrode (sample 1) failed to demonstrate desirable results as to leakage-proofing characteristics. The samples provided with the ring-like gasket between the air electrode and the holding member (samples 5 and 6) was low in the closed-circuit voltage because of the insufficient electrical connection to the air electrode.

Experiment 2

In the Experiment 2, the effect of the heights of the holding member of the metallic sealant, sealant member and the ring-like gasket on the leakage-proofing characteristics was verified.
Samples 7 to 15
Samples 7 to 15 of the air cells were fabricated in the same way as the sample 2 except that the ring-like gasket arranged between the sealant member of the metal sealant and the air electrode as shown in Table 2 was used.
The results of measurement of leakage-proofing characteristics (days of storage, 49) of these samples 7 to 15 are shown in Table 2.

TABLE 2

| samples | metal sealant Hca (mm) | Hcb (mm) | ring-like gasket Hg (mm) | leakage-proofing characteristics (per 1000) |
|---|---|---|---|---|
| sample 1 | 10 | 10 | — | 467 |
| sample 2 | 10 | 10 | 10 | 170 |
| sample 7 | 10 | 8 | 10 | 0 |
| sample 8 | 10 | 10 | 8 | 0 |
| sample 9 | 10 | 6 | 8 | 0 |
| sample 10 | 10 | 8 | 6 | 0 |
| sample 11 | 8 | 10 | 10 | 146 |
| sample 12 | 8 | 10 | 8 | 149 |
| sample 13 | 8 | 8 | 10 | 140 |
| sample 14 | 8 | 10 | 12 | 155 |
| sample 15 | 8 | 12 | 10 | 146 |

As may be seen from Table 2, the air cells in which Hca, Hcb and Hg met the relationship $Hca \geq Hg$ and $Hcb \geq Hg$ (samples 2 to 10) demonstrated superior leakage-proofing characteristics. Conversely, the air cells in which Hg is larger than at least one of Hca and Hcb (samples 11 to 15) failed to demonstrate desirable results as to the leakage-proofing characteristics after lapse of 40 days.

Experiment 3

In the Experiment 3, the effect of the groove shape on the leakage-proofing characteristics was verified.
Samples 16 to 18
Samples 16 to 18 of the air cells were fabricated in the same way as in sample 2, except setting the shape of the groove formed on drawing in the positive electrode can as shown in Table 3.
Measurements were made of leakage-proofing characteristics (days of storage: 40 days) of these samples 16 to 18. The results are shown in Table 3.

TABLE 3

| samples | grooves Rb | Rp | Ra | Rp - Ra | leakage-proofing characteristics (per 1000) |
|---|---|---|---|---|---|
| sample 1 | 0.3 | 13.5 | 12.8 | 0.7 | 467 |
| sample 16 | 1 | 13.5 | 12.8 | 0.7 | 0 |
| sample 17 | 0.5 | 13.5 | 13.1 | 0.4 | 0 |
| sample 18 | 0.3 | 13.5 | 13.1 | 0.4 | 387 |

As may be seen from this Table 3, the air cells in which Rb, Rp and Ra meet the relationship $Rb \geq Rp-Ra$ (samples 16 and 17) exhibit superior leakage-proofing characteristics. Conversely, the air cell in which $Rb < Rp-Ra$ (sample 18) is not optimum in leakage-proofing characteristics due to insufficient strength of the groove obtained on drawing.

Experiment 4

In the Experiment 4, the effect of the radius of curvature of the groove obtained on drawing on leakage-proofing characteristics was checked.
Samples 19 to 22
Samples 19 to 22 of the air cells were fabricated in the same way as in sample 2, except that the radius of curvature Rb of the groove formed on drawing was set as shown in Table 4.
Measurements were made of leakage-proofing characteristics (days of storage: 40 days) of these samples 19 to 22. The results are shown in Table 4.

TABLE 4

| samples | groove formed on drawing Rb | leakage-proofing characteristics (per 1000) |
|---|---|---|
| sample 1 | 0.3 | 467 |
| sample 19 | 0.5 | 0 |
| sample 20 | 2.5 | 0 |
| sample 21 | 4.8 | 0 |
| sample 22 | 5.2 | 0 |

As may be seen from this Table 4, the samples 19 to 21, in which the radius of curvature Rb of the groove obtained on drawing ranges between 0.5 mm and 1.0 mm, exhibit superior leakage-proofing characteristics. Conversely, the air cell in which the radius of curvature Rb of the groove obtained on drawing departs from the above range, fail to exhibit satisfactory leakage-proofing characteristics.

Experiment 5

In the experiment 5, the effect of the shape of the sealant member and the material of the holding member in the metal sealant arranged on the opening end of the positive electrode can 2 on leakage-proofing characteristics was checked.
Samples 23 to 31

Samples 23 to 31 of the air cells were fabricated in the same way as in sample 2 except that the shape of the sealant member and the material of the holding member in the metal sealant arranged on the opening end of the positive electrode can 2 were set as shown in Table 5.

Measurements were made of leakage-proofing characteristics (days of storage: 40, 60 and 80 days) of these samples 23 to 31. The results are shown in Table 5.

TABLE 5

| | sealant member | | holding member | | | leakage-proofing characteristics | | |
|---|---|---|---|---|---|---|---|---|
| samples | Hca | shape | Hcb | material | Hg | 40 days | 60 days | 100 days |
| sample 1 | — | | — | | — | 467 | 695 | 1000 |
| sample 23 | — | | 10 | metal | — | 0 | 247 | 657 |
| sample 24 | — | | 10 | resin | — | 0 | 245 | 649 |
| sample 25 | 10 | rectangle | 10 | metal | 10 | 0 | 0 | 310 |
| sample 26 | 10 | rectangle | 10 | resin | 10 | 0 | 0 | 334 |
| sample 27 | 10 | cap | 10 | metal | 10 | 0 | 0 | 319 |
| sample 28 | 10 | cap | 10 | resin | 10 | 0 | 0 | 336 |
| sample 29 | 10 | L shape | 10 | metal | 10 | 0 | 0 | 249 |
| sample 30 | 10 | rectangle | 10 | metal | 8 | 0 | 0 | 0 |
| sample 31 | 10 | rectangle | 10 | resin | 8 | 0 | 0 | 0 |

As may be seen from this Table 5, superior leakage-proofing characteristics are demonstrated if the air can and the sealant member are sealed relative to each other by radially compressing the sealant member in the metal sealant. If the material of the holding member is metal, the holding member supports the radially compressed sealant member.

Experiment 6

In the Experiment 6, the effect of the separation between the metal sealant and the sealant structure such as the gasket on leakage-proofing characteristics was checked.
Samples 32 to 35

Samples 32 to 35 of the air cells were fabricated in the same way as in sample 2, except that the height of the air electrode was changed and the separation between the metal sealant mounted on the air electrode and the sealant structure such as the gasket were set as shown in Table 6.

Measurements were made of leakage-proofing characteristics (days of storage: 100 days) of these samples 32 to 35. The results are shown in Table 6.

TABLE 6

| samples | separation Ces (mm) | leakage-proofing characteristics (per 1000) |
|---|---|---|
| sample 1 | 0 | 1000 |
| sample 32 | 0 | 9 |
| sample 33 | 0.3 | 0 |
| sample 34 | 2 | 0 |
| sample 35 | 2.5 | 129 |

As may be seen from this Table 6, the air cell in which the separation between the metal sealant and the sealing structure is set to 0.3 to 2.0 mm (samples 33, 34) exhibit superior leakage-proofing characteristics of scarcely producing leakage on storage for 100 days. On the other hand, the air cell of sample 32, in which the sealing structure is in contact with the metal sealant, the metal sealant and the air electrode are warped in fitting the sealant structure, as a result of which the air cell of sample 32 suffers from slight leakage on storage for 100 days. With the air cell of sample 35, in which the sealant structure is separated from the metal sealant by not less than 2.0 mm, the negative electrode mixture tends to be intruded into the interstice to produce internal shorting. Thus, the air cell of sample 35 suffered from slight leakage on storage for 100 days.

What is claimed is:
1. An air cell comprising:
   an air electrode in the form of a hollow tube;
   an outer peripheral can in the form of a cylinder larger in diameter than said air electrode for accommodating said air electrode therein;
   a groove formed on drawing, said groove radially compressing at least a portion of the outer peripheral surface of at least one end of said outer peripheral can;
   a ring-shaped gasket arranged between said air electrode and the outer peripheral can, said ring-shaped gasket abutting along the circumference against the inner peripheral surface of one end of said outer peripheral can; and
   a holding member arranged facing said ring-shaped gasket with said air electrode in-between, said holding member abutting along the circumference against the inner peripheral surface of said air electrode;
   said ring-shaped gasket sealing said outer peripheral can and the air electrode relative to each other by being clinched by said groove formed on drawing in said outer peripheral can and said holding member, said groove formed on drawing has a cross-section taken on severing said outer peripheral can along its center axis substantially in the form of an arc having a radius of curvature Rb, wherein
   if the inner diameter of said outer peripheral can at the bottom of said groove is Ra, and the inner diameter of said outer peripheral can at the proximal end of said groove is Rp, the following relationship:

$Rb \geq Rp - Ra$ holds, and wherein
   the radius of curvature Rb of said groove ranges between 0.5 mm and 5.0 mm.

2. The air cell according to claim 1 wherein said holding member is formed of metal.

3. The air cell according to claim 1 wherein said sealant member is arranged between said ring-shaped gasket and the outer periphery of said air electrode.

4. The air cell according to claim 3 wherein said sealant member is in the form of a bottomed tube having an opening in the bottom thereof and is fitted to at least one end of said air electrode.

5. The air cell according to claim 3 wherein said holding member and the sealant member are formed as-one with each other.

6. The air cell according to claim 3 further comprising: a second ring-shaped gasket arranged facing said holding member with said air electrode in-between so as to be clinched by said sealant member and the air electrode.

7. The air cell according to claim 6 wherein said second ring-shaped gasket has an engagement portion for engaging with an end face of said air electrode.

8. The air cell according to claim 6 wherein said second ring-shaped gasket substantially has the shape of a cylinder having its one end smaller than its other end.

9. The air cell according to claim 8 wherein said second ring-shaped gasket has its small end positioned on the end face of said air electrode.

10. The air cell according to claim 9 wherein said second ring-shaped gasket has an engagement portion for engaging with an end face of said air electrode.

11. The air cell according to claim 6 wherein if the height of the sealant member as measured from the end face of said air electrode is Hca, the height of the holding member as measured from the end face of said air electrode is Hcb and the height of said second ring-shaped gasket as measured from the end face of said air electrode is Hg, the following relationship:

$$Hca \geq Hg$$

$$Hcb \geq Hg$$

holds.

12. The air cell according to claim 1 further comprising: a gasket arranged on one end of said outer peripheral can formed with said groove, said gasket closing the one end of said outer peripheral can, the end face of said air electrode being spaced apart from said gasket.

13. The air cell according to claim 12 wherein the end face of said air electrode being spaced apart from said gasket by not less than 0.3 mm and not larger than 2.0 mm.

* * * * *